Jan. 23, 1968  E. R. BRUMMETT ET AL  3,364,985
ROTARY REGENERATOR MATRIX
Filed Oct. 27, 1966  2 Sheets-Sheet 1

INVENTORS
Earl R. Brummett, &
Kenneth O. Johnson
Paul Fitzpatrick
ATTORNEY

Jan. 23, 1968  E. R. BRUMMETT ET AL  3,364,985

ROTARY REGENERATOR MATRIX

Filed Oct. 27, 1966  2 Sheets-Sheet 2

INVENTORS
Earl R. Brummett, &
Kenneth O. Johnson

Paul Fitzpatrick
ATTORNEY

United States Patent Office 3,364,985
Patented Jan. 23, 1968

3,364,985
ROTARY REGENERATOR MATRIX
Earl R. Brummett, Indianapolis, Ind., and Kenneth O. Johnson, Cincinnati, Ohio, assignors to General Motors Corporation, Detroit, Mich., a corporation of Delaware
Filed Oct. 27, 1966, Ser. No. 589,918
7 Claims. (Cl. 165—8)

Our invention relates to rotary regenerators and is particularly concerned with improvements in the matrices of such regenerators. While the invention may be applicable to regenerators of other types, it is specially beneficial in regenerators of the radial flow or annular drum type. The principal purpose of my invention is to exploit the advantages of ceramic matrices while overcoming the disadvantages.

Rotary regenerators and matrices therefor of the radial flow or drum type are known and are described, for example, in United States Patents No. 2,888,248, which is directed primarily to a main seal for a regenerator, No. 2,937,010 on a matrix structure, No. 3,057,604 which illustrates a complete regenerator as part of a gas turbine engine, and No. 3,077,074 also showing a regenerator in a gas turbine, and United States patent application Ser. No. 361,444, filed Apr. 21, 1964, Patent No. 3,267,674, patented Aug. 23, 1966, of common ownership with this application, which discloses a different installation of a regenerator in a gas turbine engine.

Such a regenerator may be considered as comprising principally a housing, a bulkhead dividing the housing into two spaces, and a matrix drum rotatable in the housing and passing through the bulkhead so as to move through the two spaces. A gas to be heated flows radially through the matrix in one space and a gas which surrenders heat flows radially through the matrix in the other space. The regenerator includes means for locating, supporting, and rotating the matrix, main or bulkhead seals to limit leakage circumferentially of the matrix from one space to the other at the bulkhead, and bypass seals which extend around the circumference of the matrix to obstruct leakage past the ends of the matrix bypassing the matrix.

Matrices have commonly been made of heat resistant metal. Such matrices require considerable labor to assemble the many parts and present difficulties in sealing because of the distortion of the matrix resulting from a temperature gradient from the cooler surface to the hotter surface of the matrix. Integral matrices of ceramic material have become available which do not require the assembly process and which have relatively small distortion because of their very low coefficient of thermal expansion. However, these ceramic materials do not withstand well the heavy concentrated loads put on the drum by the supporting and rotating structure. In this type of matrix referred to, there are substantial gas loads biasing the matrix against rollers which support and drive it. The concentrated loads result in chipping of the ceramic matrix.

In accordance with our invention, the advantages of the ceramic are retained but the disadvantage referred to is obviated by providing metal rims which cooperate with the supporting and driving rollers, taking the high localized load and distributing it over relatively large areas of the ceramic. To achieve this, it is necessary that the substantial differential expansion between the metal and ceramic be accommodated. In a matrix 30 inches in diameter, a metal rim will expand approximately one-eighth of an inch more than the ceramic body when the matrix is heated from room temperature to an operating temperature of about 1000° F. In short, therefore, our invention is embodied in a regenerator or matrix with provisions for associating metal load carrying rims or the equivalent with a ceramic matrix body, accommodating differential expansion, and distributing the stresses between the rim and body. Structures for this purpose are disclosed and claimed in United States patent application, Ser. No. 456,274 of W. A. Turunen for Rotary Regenerator, filed May 17, 1965, of common ownership with this application. However, my regenerator matrix embodies novel and advantageous structures differing significantly from those of the prior application.

The nature of our invention and the advantages thereof will be apparent to those skilled in the art from the succeeding detailed description of preferred embodiments of the invention and the accompanying drawings thereof.

Figure 1:
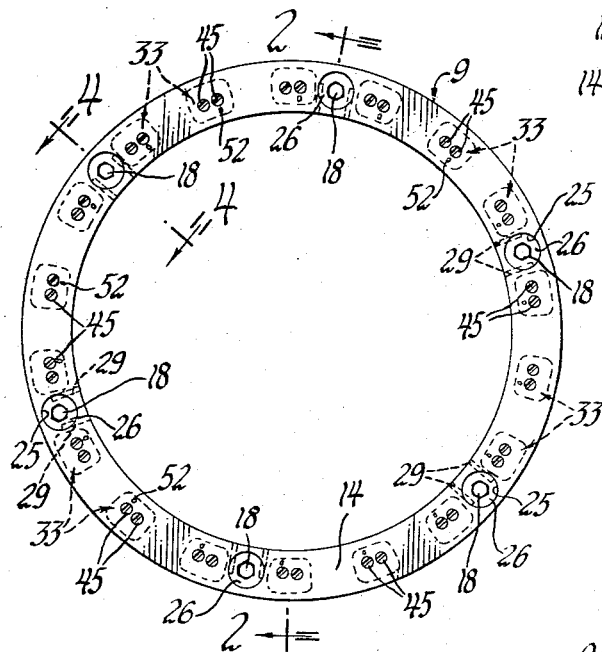
FIGURE 1 is a view of a regenerator matrix of the drum type taken on a plane perpendicular to the axis thereof.
Figure 2:
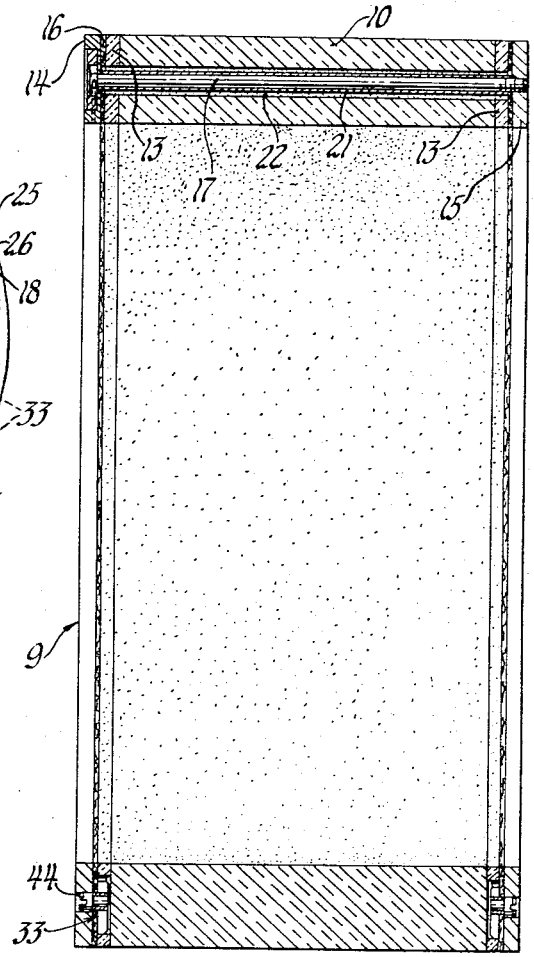
FIGURE 2 is a sectional view taken on the plane indicated by the line 2—2 in FIGURE 1.
Figure 4:
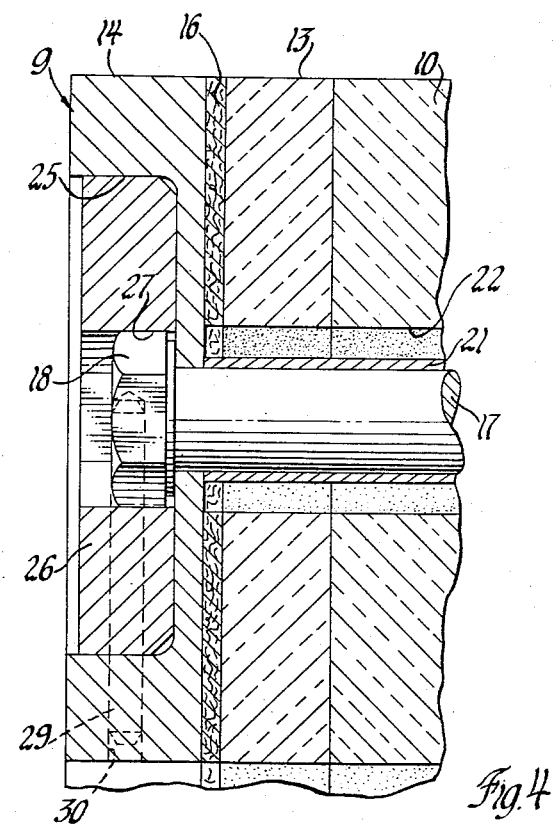
FIGURE 4 is a further enlarged sectional view taken on the plane indicated by the line 4—4 in FIGURE 3.
Figure 3:
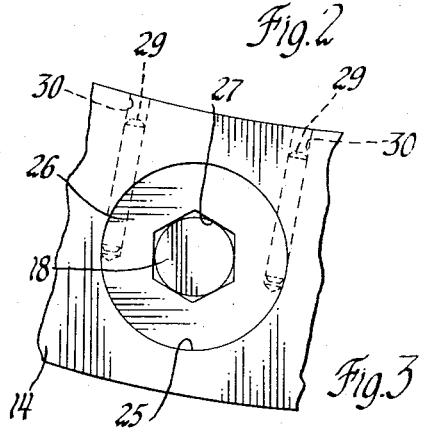
FIGURE 3 is a fragmentary enlarged view of a portion of FIGURE 1.

In view of the fact that regenerators of the sort in which our invention is applied are well known and representative ones are described in the patents and patent applications referred to above, and since our matrix may be used in various regenerators, the description herein will be confined to the matrix itself.

The matrix 9 comprises an annular cylindrical drum 10, the major portion of which is of a ceramic structure defining small passages extending between the inner and outer surfaces thereof so that the matrix is pervious to flow of gas radially through it. The drum also includes end portion 13 which are non-porous ceramic cemented to or otherwise integral with the porous body 10 of the matrix. Rims or end rings 14 and 15 are mounted on the ends of the drum. These rings are of metal having desirable properties of strength and toughness at the operating temperatures of the matrix. A yieldable gasket 16 of a high temperature resisting material such as yieldable asbestos compound or woven metal is disposed between each rim 14, 15 and the end portion 13. The two rims are held together and against the drum by a number, six, for example, of long bolts 17 which are threaded into rim 15, having heads 18 engaging the rim 14. The bolts 17 are disposed within tubes 21 which engages the inner faces of the rims 14 and 15 to provide a limit on the distance between the two rims to prevent imposition of undesirable compressive loads on the drum 10. Relative axial expansion of the drum 10 and bolts 17 is accommodated by compression and expansion of gaskets 16. The bolts 17 and tubes 21 extend through axial holes 22 in the drum which provide substantial clearance from the tubes 21. The bolt head 18 is disposed within a circular recess 25 in rim 14 which provides clearance for a wrench to tighten the bolt 17 to the desired degree. After the bolts have been properly tensioned, lock rings 26 are disposed in the recesses 25, each ring having a circular periphery and a hexagonal interior opening 27 fitting the bolt head 18. The lock rings are fixed against rotation by one or a pair of pins 29 disposed in radial bores 30 drilled into the rim and the lock ring 26. Pins 29 may, for example, be the expansible type of hollow pin known as spring pins.

Figure 5:
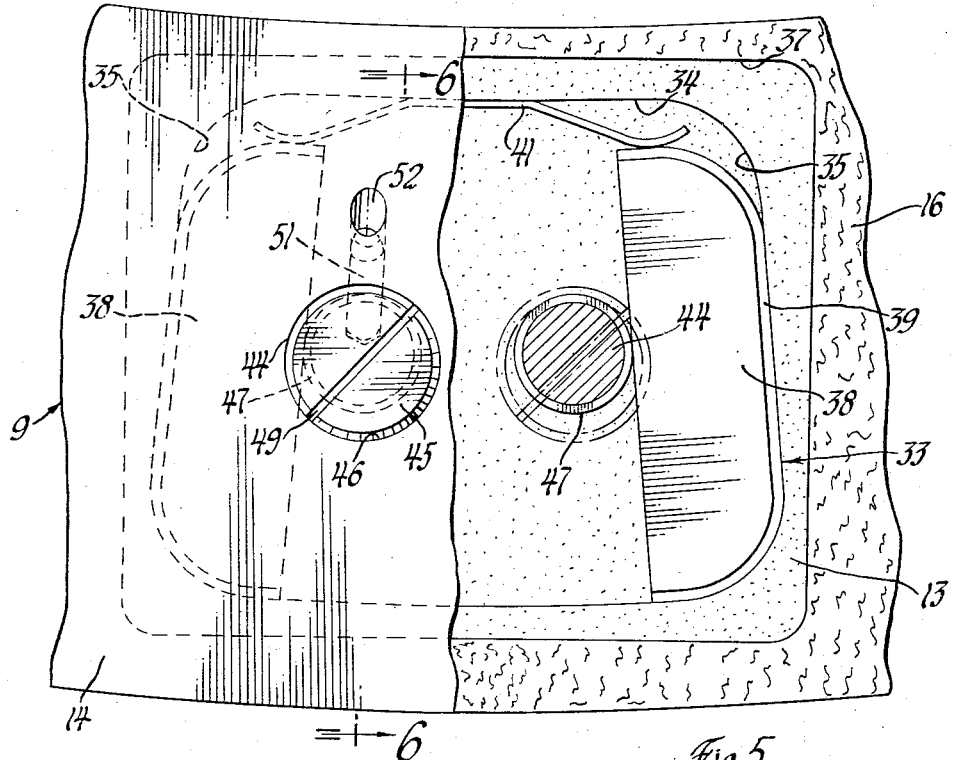
FIGURE 5 is an enlarged view of a portion of FIGURE 2 with parts cut away.
Figure 6:
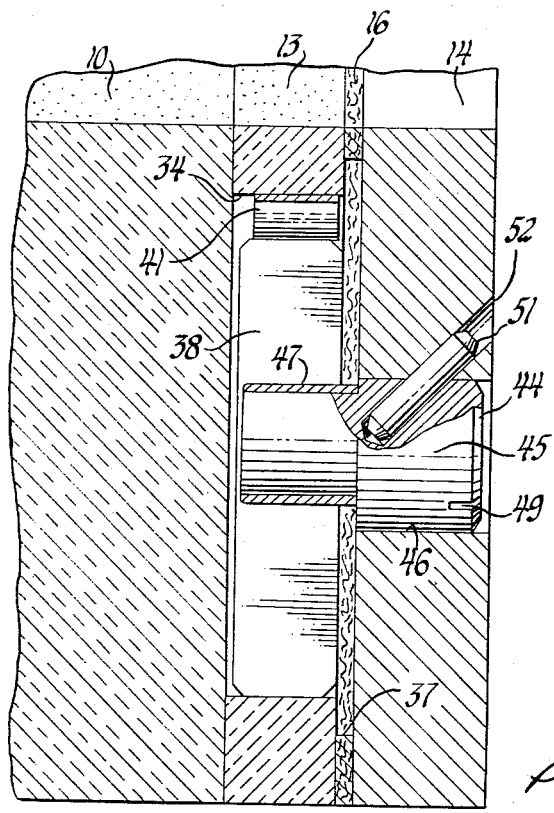
FIGURE 6 is a sectional view taken on the plane indicated by the line 6—6 in FIGURE 5.

Proceeding now to the structure by which the rims are maintained in alignment with the drums and the gas loads and driving torques are transmitted between the rims and drum, this comprises a number of drive means 33 distributed around the rim. As illustrated in FIGURE 1, there are eighteen such drive means at each end of the drum; the number is a matter of design. This structure is shown principally in FIGURES 5 and 6. A number of circumferentially spaced recesses or pockets 34 are provided in each end of the drum. These pockets may and, as illustrated, do extend through the solid end portion 13 of the drum. They have substantially radial walls 35 which provide the abutments by which the rim is coupled to the drum for transmission of torsional and transaxial loads. The gasket 16 is cut away as indicated at 37 around the recess 34. A shoe 38 which may be generally of rectangular cross section with rounded or chamfered edges as indicated at 39 is disposed so as to bear against each of the walls 35. These shoes are biased so as to lie in the radially outer portion of the recess 34 for assembly by a leaf spring 41 of bowed form which bears against the radially inner wall of the recess and against the radially inner ends of the shoes.

The shoes 38 are pushed apart into engagement with the walls 35 and coupled to the rim 14 or 15 by eccentric pins 44 which have a cylindrical head 45 which is a rotatable fit in a bore 46 in the rim. Head 45 is integral with an eccentric pin which bears a bushing 47. The eccentric pin bushing 47 bears against the shoe 38 adjacent its mid-point and the pin may be rotated by an application of a tool to the screw driver kerf 49 or other suitable tool-engaging configuration of the head. Since all of the eccentric pins 44 may be adjusted independently, it is possible to control the pressure exerted in each of the pockets 34 and also to center the rim exactly with the ceramic drum. This alignment and adjustment of the pressure on the shoes is accomplished before the final tightening of the bolts 17 which couple the rims to the drum. The adjustment of the eccentrics 44 may be preserved by any suitable means such as a spring pin 51 disposed in a drilled hole 52 lying partly in the rim and partly in the head 45, the hole being drilled after the adjustment is finalized.

The mode of assembly of the matrix should be apparent from the foregoing but may be described briefly. Shoes 38 and springs 41 are disposed in the recesses 34 of the drum and the rims are put in place with the eccentrics 44 in a slack position. The bolts 17 encased in tubes 21 are put in place with or without the spring washer 17 with the gasket or gaskets 16 if employed disposed between the rim and drum. The bolts 17 are tightened lightly, the rims are aligned so as to be concentric with the drum, and the eccentrics 44 are turned so as to bring them into engagement with the shoes 38 and are then locked. The bolts 17 are tightened further to the desired degree and are secured by the lock rings 26 or 66.

It will be seen that the forces transmitted between the ceramic drum and the metal rim are distributed over a large contact area between the walls 35 and shoes 38. This contact surface extends substantially radially of the matrix so that the rim can expand with a slight sliding motion of the pins 47 on the shoes 38 without undesirable stresses on the drum or rim. The structure provides a simple adjustment for forces and for concentricity and is adapted to withstand high temperature operation.

The detailed description of the preferred embodiment of the invention for the purpose of explaining the principles thereof is not to be considered as limiting or restricting the invention, as many modifications may be made by the exercise of skill in the art.

We claim:
1. An annular matrix for a radial-flow regenerator comprising, in combination:
   a drum having structure pervious to flow in a radial direction, the drum being composed of a material of relatively low thermal expansion
   a rim at each end of the drum having thermal expansion substantially different from that of the drum
   and mean coupling the rims to the drum adapted to accommodate relative expansion of the drum and rims and to distribute forces between the drum and rims over substantial areas of the drum, the coupling means comprising
   tension means connecting the rims and holding the rims in engagement with the drum
   means defining a plurality of circumferentially spaced pockets in each end of the drum, each pocket having opposed walls extending generally radially and axially of the drum
   a pair of shoes disposed in each pocket engaging the said walls, respectively
   and means on the rim engaging the shoes pressing the shoes of each pair apart and holding the shoes in contact with the said walls.
2. A matrix as defined in claim 1 including also yieldable structure disposed between the tension means and the drum to accommodate relative axial expansion of the tension means and drum.
3. A matrix as defined in claim 2 in which the yieldable structure comprises a gasket between the drum and a rim.
4. A matrix as defined in claim 2 in which the yieldable structure comprises spring washer means between the tension means and a rim.
5. A matrix as defined in claim 1 including also resilient means biasing the shoes radially toward one radial end of the pocket.
6. A matrix as defined in claim 1 in which the last-recited means includes a separate means independently adjustable circumferentially of the rim engaging each of the shoes of a pair.
7. A matrix as recited in claim 6 in which the adjustable means are eccentrics adjustable from the exterior of the rim.

References Cited

UNITED STATES PATENTS

| | | | |
|---|---|---|---|
| 2,579,212 | 12/1951 | Stevens et al. | 165—9 X |
| 3,083,762 | 4/1963 | Kolthoff et al. | 165—8 |
| 3,167,115 | 1/1965 | Chute | 165—7 |
| 3,294,156 | 12/1966 | Beaufrere et al. | 165—10 X |
| 3,301,317 | 1/1967 | Weaving et al. | 165—8 |
| 3,311,204 | 3/1967 | Barnard | 165—8 X |

FOREIGN PATENTS 975,776   11/1964   Great Britain.

ROBERT A. O'LEARY, *Primary Examiner.*

A. W. DAVIS, JR., *Assistant Examiner.*